(12) United States Patent
Mori et al.

(10) Patent No.: US 6,197,079 B1
(45) Date of Patent: Mar. 6, 2001

(54) PLEATED AIR FILTER AND METHOD FOR PRODUCING SAME

(75) Inventors: Hisashi Mori; Masami Aoki, both of Kanagawa-ken (JP)

(73) Assignee: Bridgeston Corporation, Tokyo (JP)

( * ) Notice: Subject to any disclaimer, the term of this patent is extended or adjusted under 35 U.S.C. 154(b) by 0 days.

(21) Appl. No.: 09/149,779

(22) Filed: Sep. 8, 1998

Related U.S. Application Data

(63) Continuation-in-part of application No. 08/847,298, filed on Apr. 24, 1997, now Pat. No. 5,820,644.

(30) Foreign Application Priority Data

Apr. 25, 1996 (JP) .................................................... 8-131099
Apr. 25, 1996 (JP) .................................................... 8-131100
Apr. 25, 1996 (JP) .................................................... 8-131101

(51) Int. Cl.[7] .................................................... B01D 39/16
(52) U.S. Cl. .......................... 55/385.3; 55/524; 55/527; 55/528; 55/DIG. 13; 55/DIG. 39; 264/284; 264/293; 264/DIG. 48

(58) Field of Search ..................................... 55/385.3, 524, 55/527, 528, DIG. 5, DIG. 13, DIG. 39, DIG. 42; 264/284, 293, DIG. 48

(56) References Cited

U.S. PATENT DOCUMENTS

| | | | |
|---|---|---|---|
| 3,171,820 | * | 3/1965 | Volz ................................. 55/DIG. 13 |
| 4,099,943 | * | 7/1978 | Fischman et al. .............. 55/DIG. 13 |
| 4,178,161 | * | 12/1979 | Rudner et al. .................. 55/DIG. 13 |
| 4,961,974 | * | 10/1990 | Jones ............................... 55/DIG. 5 |
| 4,981,501 | * | 1/1991 | Von Blucher et al. ......... 55/DIG. 13 |
| 5,820,644 | * | 10/1998 | Mori et al. ...................... 55/DIG. 13 |

* cited by examiner

*Primary Examiner*—David A. Simmons
*Assistant Examiner*—Minh-Chau T. Pham
(74) *Attorney, Agent, or Firm*—Jordan and Hamburg LLP

(57) ABSTRACT

An air filter suitably usable in an air cleaner, room air-conditioner or especially in car air-conditioners in which air is driven at a high speed. The air filter is made of a pleated polyurethane foam having on one or both sides thereof a three-dimensional network skeletal structure of micro cells.

14 Claims, 6 Drawing Sheets

PLEATED AIR FILTER AND METHOD FOR PRODUCING SAME

This is a continuation-in-part of application Ser. No. 08/847,298, filed Apr. 24, 1997, now U.S. Pat. No. 5,820,644.

BACKGROUND OF THE INVENTION

The present invention relates to an air filter suitable for use in air cleaners, room air-conditioners, and particularly in car air-conditioners in which air is driven at a high speed.

For high efficiency dust collection and deodorization with a reduced pressure loss, it has been proposed to use a pleated paper-like dust-collecting and/or deodorizing filter. By virtue of pleating, the filter can have an increased surface area of contact with air. The paper-like filter is formed from an electricified nonwoven fabric or an electricified sheet of fibers formed like a nonwoven fabric. The electricified sheet of fibers is known to collect submicron dust particles as well as larger particles due to a Coulomb's force imparted to the sheet of fibers through the electricification, and even an electricified sheet of fibers having a small mass per unit area is superior in the performance of dust collection to a nonwoven fabric not electricified.

For the conventional air filter used in car air-conditioners in which air is driven at a high speed, however, mechanical dust collection (by inertia and collision) is essential, rather than the Coulomb's force. Namely, the electrification will not lead to any efficient dust collection when an air filter having a Coulomb's force is used in such a car air-conditioner. In an air cleaner in which air is driven at a high speed, a high efficiency of dust collection can be attained by an air filter which has an ample and effective contact with dust particles. However, since a fibrous or paper-like air filter made using a nonwoven fabric or sheet of fibers as a matrix incurs a large pressure loss, an increase in surface area of the air filter by pleating will only lead to some reduction of the pressure loss. Imparting the function of deodorization to the air filter will additionally increase the pressure loss. Such air filters provide no effective and efficient dust collection and deodorization in applications for which the pressure loss should be small. Also since mechanical dust collection is more essential for collection of coarse dust particles of 5 μm or more in size, the electricification of the matrix for the air filter did not allow any effective dust collection in applications in which air is to be driven at a high speed and coarse dust particles are to be collected.

SUMMARY OF THE INVENTION

Accordingly, it is an object of the present invention to overcome the above-mentioned drawbacks of the prior-art air filters by providing an improved air filter capable of collecting dusts and deodorizing highly effectively and efficiently in applications in which air is driven at a high speed, such as car air-conditioners.

The above object is accomplished by providing an air filter made of a pleated polyurethane foam having formed on one or both sides thereof a three-dimensional network skeletal structure of micro cells. The air filter according to the present invention is capable of collecting dusts highly effectively and efficiently with a reduced pressure loss even when used in a car air-conditioner in which air is driven at a high speed.

These objects and other objects, features, aspects and advantages of the present invention will become more apparent from the following detailed description of the present invention when taken in conjunction with the accompanying drawings.

DETAILED DESCRIPTION OF THE INVENTION

Figure 1:
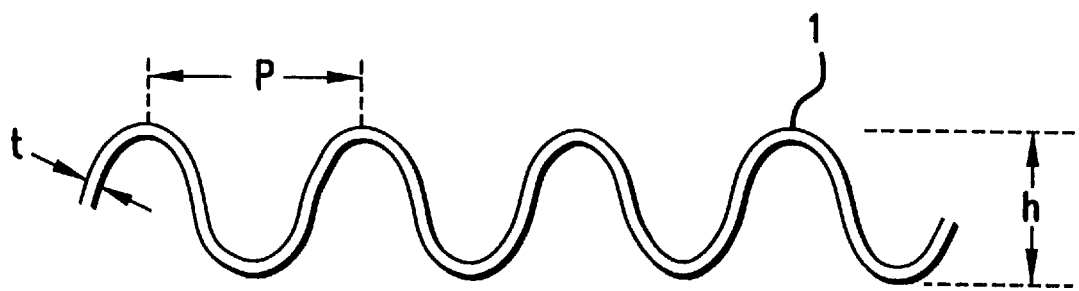
FIG. 1 is a side elevation of a first embodiment of air filter according to the present invention.

In FIG. 1 showing the first preferred embodiment of air filter according to the present invention, the reference numeral 1 indicates a matrix pleated by an accordion pleating machine. The matrix 1 comprises a polyurethane foam having formed on one or both sides thereof a three-dimensional network skeletal structure of micro cells. The three-dimensional network skeletal structure used in the present invention refers to a skeletal structure made of a polyurethane resin and having the form of a regular dodecahedron.

The matrix 1 comprises a flat sheet of polyurethane foam having a three-dimensional network skeletal structure of 5 mm in thickness and 50 pores per inch. Using an accordion pleating machine, the flat matrix 1 is pleated to have a crest height h of 20 mm, pleating pitch (inter-crest distance) p of 10 mm and pleating factor of 4 (length of the pleated matrix is a quarter of that of the original flat matrix before pleated). The pleated matrix 1 is taken as the first embodiment of the present invention. The matrix 1 before being pleated is taken as a comparison example #1. A nonwoven fabric of polypropylene is pleated to have a crest height of 15 mm, pleating factor of 4.4 and pleating pitch of 7 mm. This nonwoven fabric is taken as a reference example. These air filters were tested as to pressure loss and efficiency of dust collection. The test results are as shown in Table 1.

TABLE 1

| | Pressure loss (mmAq) | Dust Collection Efficiency (%) |
|---|---|---|
| First embodiment | 7.8 | 85 |
| Comparison example #1 | 13.5 | 53 |
| Reference example | 8.5 | 87 |

Figure 2:
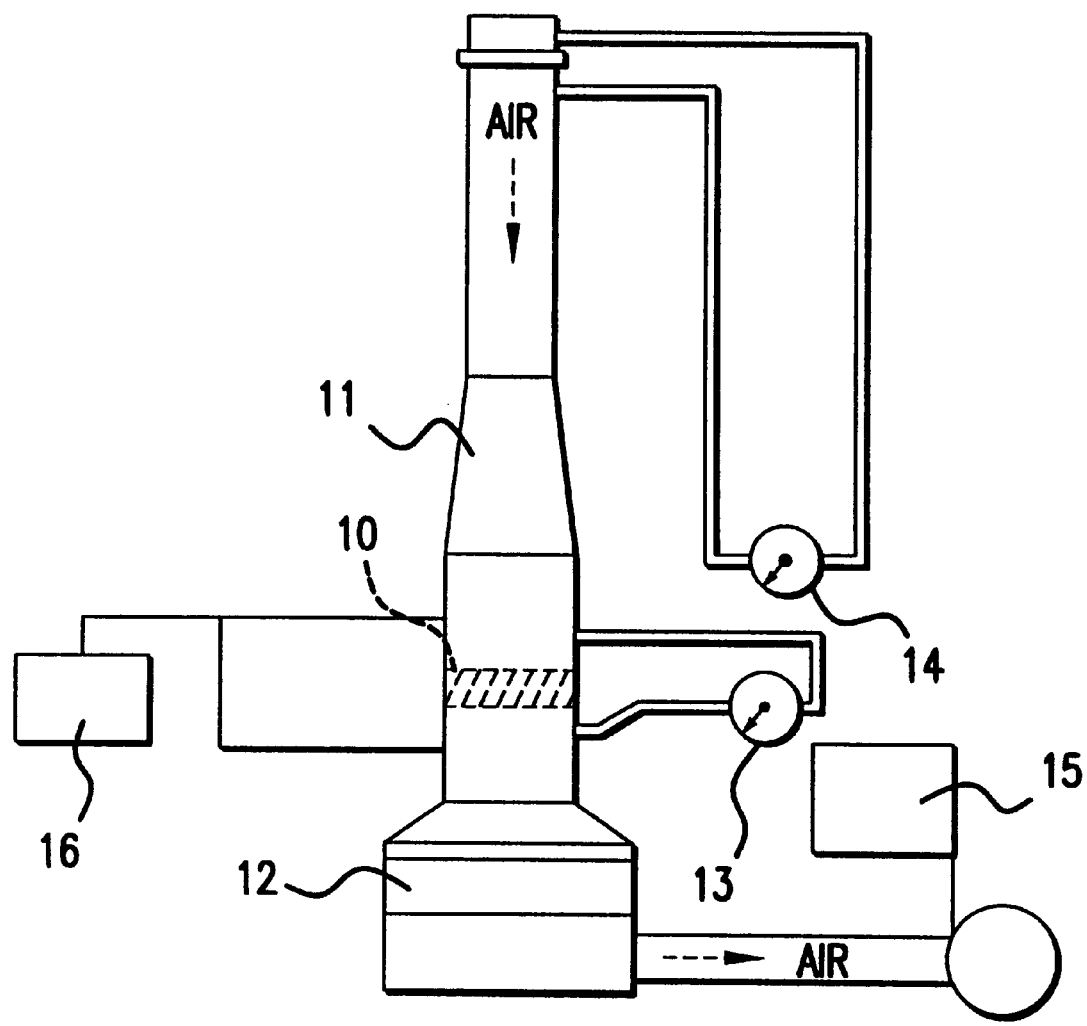
FIG. 2 shows a method for measuring the pressure loss through the air filter according to the present invention.

For measurement of the pressure loss and dust collection efficiency shown in Table 1 a measuring device shown in FIG. 2 was used. The device consisted of a wind tunnel 11, fan 12 pressure loss meter 13, wind speed indicator 14, control panel 15, and a particle counter 16. In the wind tunnel 11, an air filter 10 under test was placed between the upstream and downstream probes of the pressure loss meter 13, as well as between the upstream and downstream probes of the particle counter 16. Air flow at a speed of 3 m/sec was created by the fan 12. For determination of the pressure loss through the filter 10, the wind pressure was measured upstream and downstream of the filter 10, by the respective probes of the pressure loss meter 13. The difference between the measured wind pressures was calculated and indicated on the pressure loss meter 13. This measured difference represents the pressure loss through the filter 10. For determination of the dust collection efficiency of the filter 10, dust particles of 1 μm or more in air were counted upstream and downstream of the filter 10 by the respective probes of the particle counter 16. The dust particles were counted per 0.01 ft$^3$. For this testing, the atmosphere in the laboratory room was measured. The inside dimensions of the portion of the wind tunnel 11 where the test filter 10 was place was 250×250 mm.

By virtute of to the pleating, the first embodiment has an increased area of contact with air, a reduced pressure loss and an increased power of dust collection as compared with the comparison example 190 1. Also, since the first embodiment used the matrix 1 comprising a polyurethane foam having a three-dimentional network skeletal structure, it can attain nearly the same dust collection as the reference example with a smaller pressure loss.

Figure 3:
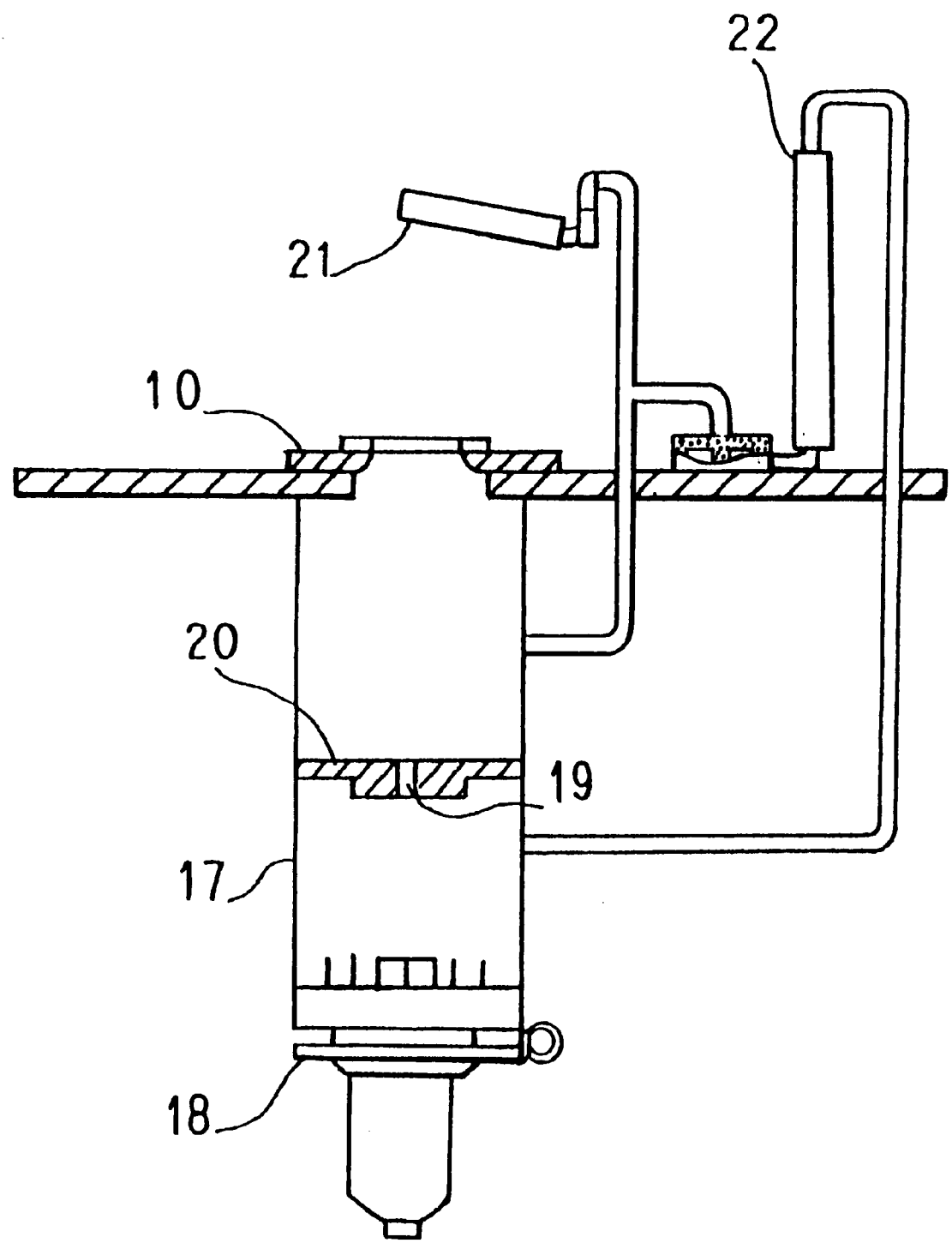
FIG. 3 shows a method for measuring the air permeability of the air filter according to the present invention.

The air permeability (cm$^3$/cm$^2$/sec) of the matrix 1 having a thickness of 10 mm should be 150 or more, or more preferably 250 or more, as measured by a FRAGILE type testing apparatus as specified in the Standard JIS L 1004-1972 (Testing Method for Cotton Fabrics) as shown in FIG. 3. The major components of the FRAGILE type testing apparatus shown in FIG. 3 include a cylinder 17 on which a test filter 10 is receivable on the top thereof, a forced draft fan 18 provided at the bottom of the cylinder 17, a partition 20 provided inside the cylinder 17 at the intermediate height of the latter and having a hole 19 formed therein, an inclined barometer 21 and an upright barometer 22. The inclined barometer 21 is adjusted to read a water-column pressure of 1.27 cm. After a test filter 10 is set on the top of the cylinder 17, air is forced into the cylinder 17 by the forced draft fan 18. An air passage through the test filter 10 or air permeability thereof is determined based on a pressure indicated on the vertical barometer 22 when the inclined barometer 21 reads the preset water-column pressure of 1.27 cm, and on the type of the hole 19 in the partition 20 used in this measurement. The number of pores per inch of the matrix 1 should preferably be 6 to 80, or more preferably be 9 to 50.

Generally, the air filter is made by pleating the single layer of the matrix 1. However, it may be formed by superimposing on the matrix 1 a polyurethane foam treated to have an antibacterial effect or a one treated to be tacky and have an improved performance of dust collection, or a lamination of polyurethane foams having different cell densities, and pleating the matrix structure thus formed.

Figure 4:
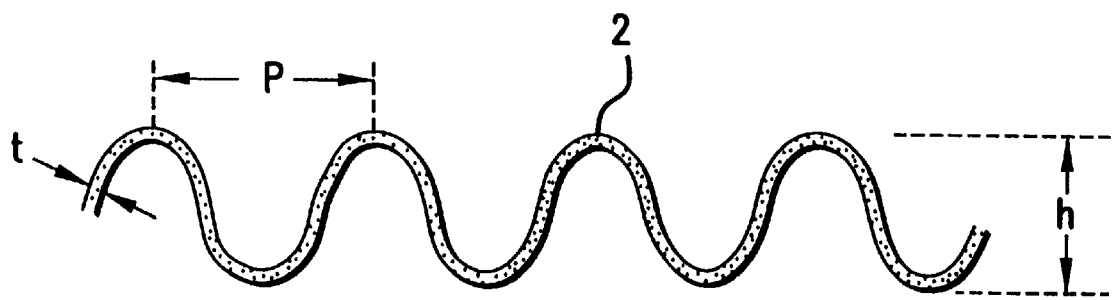
FIG. 4 is a side elevation of a second embodiment of air filter according to the present invention.

FIG. 4 shows the second preferred embodiment of air filter according to the present invention. This air filter is made by pleating a matrix 2 comprising a polyurethane foam having formed on one or both sides thereof a three-dimensional network skeletal structure of micro cells, a non-solvent type binder layer applied to and into the surface of the porous skeletal structure of the polyurethane foam, and a layer of adsorbing particles some of which are attached in contact to the binder layer and a remainder of which are exposed. The adsorbing particles have a mean size falling in a range from 1/50 to 1/1.5 of the mean inter-skeletal distance of the polyurethane foam. In the second embodiment shown in FIG. 4, the matrix 2 has a thickness t of 2.5 mm, pleating pitch p of 10 mm and crest height h of 20 mm. Even when sprayed to the surface of the binder layer, the adsorbing particles having a mean size greater than 1/1.5(67%) of the mean inter-skeletal distance (cell diameter) of the polyurethane foam have difficulty in penetrating deep into the porous skeletal structure. Most of them adhere to near the surface of the matrix 2. However, their adhesion is so weak that the adsorbing particles once applied to the matrix surface easily come off from the surface. This is considered to be caused by the size of the adsorbing particles, relatively larger than their area of adhesion to the polyurethane foam. Also, if the mean size of the adsorbing particles is less than 1/50 (2%) of the cell diameter, only a remarkably reduced number of the particles will adhere to the polyurethane foam. This is considered to be by a phenomenon in which because a thin layer of the fine adsorbing particles will cover the binder layer applied to the polyurethane foam so that no more particles can adhere to the polyurethane foam surface. As a result, the adsorbing particles as a whole have a reduced power of dust adsorption. Therefore, the aforementioned range of the mean particle size from 1/50 to 1/1.5 of the cell diameter is extremely essential in order for the adsorbing particles to discretely bite or penetrate into the porous structure and maintain their adsorbing power. For maintaining the air permeability and increasing the absolute adsorptive power, the mean size of the adsorbing particles should preferably be included within a range from 1/10 to ½ of the cell diameter. Furthermore, the particle size distribution of the adsorbing particles should be such that 95% or more by weight of the particles have sizes 1/5 to 5 times, or more preferably 1.2 to 2 times, of the mean particle size.

The air permeability (cm$^3$/cm$^2$/sec)of the matrix 2 having a thickness of 10 mm should be 150 or more, or more preferably 250 or more, as measured by the FRAGILE type testing apparatus as specified in the Standard JIS L 1004-1972 (Testing Method for Cotton Fabrics) as shown in FIG. 3. The numbers of pores per inch of the matrix 2 should be 6 to 80, or more preferably 9 to 50.

The adsorbing particle may be any one freely selected, according to an intended purpose, from those having already been used in practice such as activated carbon, activated clay, active alumina, silica gel powder or the like.

The non-solvent type binder may be any one appropriately selected from various kinds currently available. However, it should preferably be a one having a high adhesion and which is not likely to clog the fine holes in the adsorbing particles. For example, a non-solvent type binder having more non-volatile matter and less volatile matter, namely, a non-volatile matter in 30% or more by weight, or more preferably 50% or more by weight, should be selected. More particularly, a urethane prepolymer containing excess NCO, or more preferably a urethane prepolymer containing MDI (methylenediisocyanate) as the base, should be used as the non-solvent binder. The MDI-based prepolymer will not more easily produce free isocyanate and will cause less sanitary problems in the process of production, than a urethane prepolymer containing TDI (tolylenediisocyanate) as the base. In a case where a urethane prepolymer containing excess NCO is used as the binder, if its viscosity is too high, a minimum necessary amount of an organic solvent is added to the prepolymer and then the prepolymer applied to the polyurethane foam. Most of the organic solvent is evaporated by drying the binder with a hot air and then adsorbing particles are applied to the binder. This process is advantageous in that the fabrication of the air filter according to the present invention can be facilitated while the solvent can be prevented from being adsorbed. The non-solvent type binder may be applied to the polyurethane foam by dipping the latter in a binder impregnation bath and then removing the excess binder from the polyurethane foam by squeezing the binder with a roll, by applying the binder to the polyurethane foam surface by spraying or roll-coating and then squeezing the binder with a roll to penetrate the binder into the polyurethane foam, or by any other suitable means. To attach adsorbing particles to the polyurethane foam to which the binder has previously been applied as mentioned above, a fluidized bed coating, powder spraying or sieving process may be used. In the fluidized bed coating, the polyurethane foam is dipped in the adsorbing particles fluidized while being vibrated. By the powder spraying or sieving, techniques the polyurethane foam is uniformly coated on both sides thereof with the adsorbing particles sprayed or sieved while the foam is being reversed or turned over. During and/or after application of the adsorbing particles, the polyurethane foam is vibrated to promote the impregnation or penetration of the adsorbing particles into the polyurethane foam and positive adhesion of the adsorbing particles to the polyurethane skeleton. Furthermore, the polyurethane foam coated with the adsorbing particles is passed through a single set, or a plurality of sets, of rolls. As lightly pressed between the rolls, the adsorbing particles can be attached more securely to the polyurethane foam skeleton. A suitable inter-roll space for this purpose is 90 to 60% of the polyurethane foam thickness.

The non-solvent type binders may be solidified by suitable methods for them, respectively. When the binder is a urethane prepolymer, it can be cured in a hot stream. This curing method is simple and provides significant adhesion of the binder to the polyurethane foam.

Figure 5:
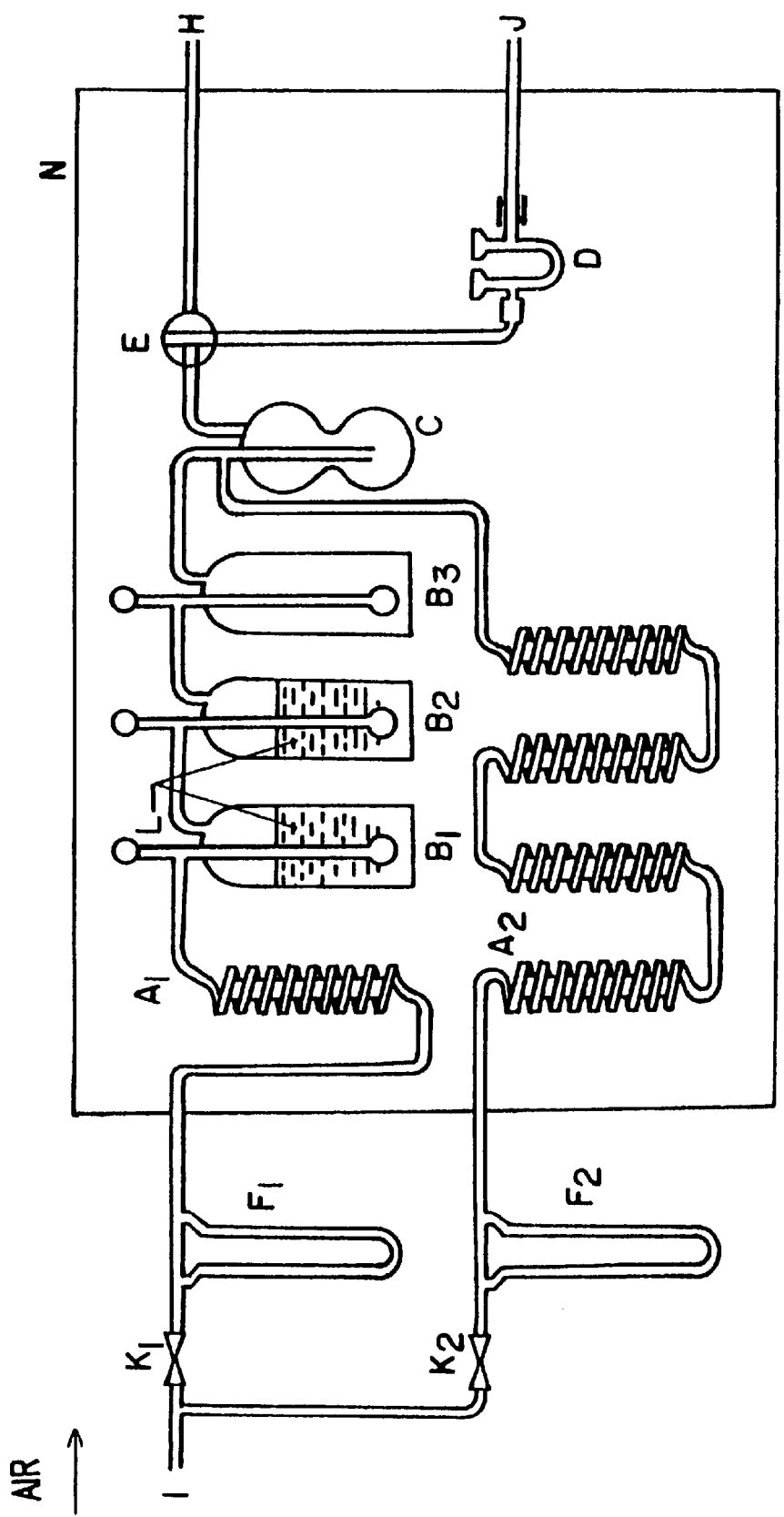
FIG. 5 shows a method for measuring the gas absorbing power of the air filter according to the present invention.

A polyurethane foam of 15 mm in thickness and 100×100 mm in other dimensions, 300 or more in air permeability, 4.2 g in weight and 2.5 mm in inter-skeletal distance (cell diameter) was prepared for the experiments on the air filter according to the present invention. The polyurethane foam was applied, by impregnation, with a non-solvent type binder (carbodiimide denatured MID and prepolymer of polypropylene glycol) having the same weight as the polyurethane foam. Six pieces of this polyurethane foam were prepared. They were applied, by powder spraying, first to one side thereof and then to the other side with an activated coconut-husk carbon particles of 2.2 mm to mean particle size (for comparison example #2), a one of 1.5 mm (for matrix example #1), a one of 0.6 mm (for matrix example #2), a one of 0.3 mm (for matrix example #3), a one of 0.1 mm (for matrix example #4) and a one of 0.02 mm (comparison example #3), respectively. Then, each test piece was vibrated to shake off the activated carbon particles which were not secured to the polyurethane while the adhesion of the activated carbon particles sticking to the polyurethane foam was enhanced. The comparison examples #2 and #3 and the matrix examples #1 and #4 were tested for the amount (g) of the activated carbon particles secured to the polyurethane foam, impregnation or penetration into the polyurethane and adhesion of the activated carbon particles, and adsorbing power of the activated carbon particles. The adsorbing power was tested as specified in the Standard JIS K 1474-1975 (Testing Method for Activated Carbon) as shown in FIG. 5. FIG. 5 shows an apparatus for measuring the dust adsorbing power. The apparatus comprises temperature control spiral tubes A1 and A2 gas cleaning bottles B1 to B3 (each of 250 ml in capacity), a mixing bottle C, a U-shaped tube D for measurement of the adsorbing power, a three-way cock E, a flow meter F1 for solvent evaporation air, a flow meter F2 for dilution air, an excess gas outlet, an dry air inlet I, an exhaust port J, gas flow rate control cocks K1 and K2, benezene L and a thermostatic oven or constant-temperature water bath N. Each of the test pieces was cut into cubes of 15×15×15 mm in dimensions. Six cubes were put into the U-shaped tube D. Air containing the benzene vapor was passed through the U-shaped tube D at a rate of 2 liters/min. The weight addition to the sample when the sample weight(20.25 cc) would not further increase was taken as the equilibrium amount of benezene adsorption. The test results are shown in Table 2.

TABLE 2

| | Mean size of activated carbon particles (mm) | Particle size/cell dia. ratio (%) | Attached amount of activated carbon (g) | Impregnation or penetration of activated carbon | Adhesion | Adsorbing power (G/20.2 cc) | Overall judgement |
|---|---|---|---|---|---|---|---|
| Comparison example #2 | 2.2 | 88 | 16.0 | X | Δ | 0.78 | Δ |
| Matrix example #1 | 1.5 | 60 | 16.5 | ○ | ○ | 0.71 | ○ |
| Matrix example #2 | 0.6 | 24 | 5.5 | ⊙ | ⊙ | 0.23 | ⊙ |
| Matrix example #3 | 0.3 | 12 | 3.1 | ⊙ | ○ | 0.11 | ○ |
| Matrix example #4 | 0.1 | 4 | 2.4 | ⊙ | ○ | 0.07 | ○ |
| Comparison example #3 | 1.02 | 0.8 | 1.3 | ⊙ | X | 0.04 | Δ |

In Table 2, "⊙" means "very good", "○", means "good", "Δ" means "fair", and "X" means "poor".

As is apparent from Table 2, the comparison example #2 using an activated carbon of which the mean particle size is 2.2 mm (88% in particle size/cell diameter ratio) had a large amount of attached activated carbon and showed a correspondingly high adsorbing power. However, only a small part of the activated carbon was impregnated or penetrated into the polyurethane foam skeleton. Most of them were attached to near the surface of the polyurethane foam but their adhesion was weak. The comparison example #3 using an activated carbon of which the mean particle size is 0.02 mm (0.08% in particle size/cell diameter ratio) had the activated carbon attached to the polyurethane foam in a small amount because the fine activated carbon particles formed a thin layer covering the blinder layer. Therefore, this comparison example #3 did not shown so great an adsorbing power. As seen from Table 2, the matrix examples #1 to #4 using activated carbons of which the particle size/cell diameter ratios fall between those of the comparison examples #2 and #3, showed a good balance between the attached amount of activated carbon and adsorbing power.

A polyurethane foam of 16 pores per inch and a thickness of 2.3 mm was applied, by impregnation, with up to 27 g/liter of an acryl type emulsion binder (with non-volatile matter in 50%) and then dried. The polyurethane foam thus treated was applied, to both sizes thereof and thereinto, with activated coconut-husk carbon particles each of 60 meshes in size and having an adsorbing surface area of 1500 $m^2/g$, thereby forming the matrix 2 as shown in FIG. 4. An accordion pleating machine was employed to pleat the matrix 2 as in the following manner. The matrix 2 was pleated to have a crest height h of 20 mm, pleating pitch p of 10 mm and a pleating factor of about 4 (length of the pleated matrix is approximately a quarter of that of the original flat matrix before pleated). The matrix 2 was thus pleated to provide a second embodiment. Also, a same matrix 2 not pleated was taken as a comparison example #4. Differences were found between the second embodiment and comparison example #4 as shown in Table 3. The attached amount of the adsorbing particles was 1140 $g/m^2$ in the second embodiment, and 290 $g/m^2$ in the comparison example #4.

TABLE 3

| | Pressure loss (mmAq) | Deodorizing power (initial) | | Attached amount of deodorant $g/m^2$ |
| --- | --- | --- | --- | --- |
| | | 80 ppm of n-butane | 3 ppm of acetaldehyde | |
| Second embodiment | 4.7 | 79% | 77% | 1140 |
| Comparison example #4 | 7.75 | 30% | 28% | 290 |

The pleated shape of the matrix contributed to a great reduction of the pressure loss through the air filter in comparison with the flat shape and thus to a considerably improved deodorization. The pressure loss was measured with a test filter 10 set in the wind tunnel 11. Air is driven or blown into the wind tunnel 11 at a speed of 3 m/sec by the fan 12. For determination of the pressure loss through the filter 10, the wind pressure was measured upstream and downstream of the filter 10, by the respective probes of the pressure loss meter 13. The difference between the wind pressures thus measured is the pressure loss through the air filter 10. For determination of the deodorizing power of the air filter, a test piece of 14 mm in diameter cut from a test filter was set in the center of a glass tube of 14 mm in inside diameter and 200 mm in length. A single gas as specified in Table 4 was blown into the glass tube at a flow rate of 12 liters/min and a speed of 1.3 m/sec. A gas chromatograph having a hydrogen flame ionization detection was used to measure the gas concentration before and after the test filter was set in the glass tube. The difference in gas concentration thus measured was used to evaluate the gas removal.

TABLE 4

| | Gas concentration | Measurement at: |
| --- | --- | --- |
| Removal of n-butane | 80 ppm | at lapse of 20 sec from air blowing |
| Removal of acetaldehyde | 3 ppm | at lapse of 35 sec from air blowing |

The matrix 2 comprises, as the base, a polyurethane form having a three-dimensional network skeletal structure. Therefore, the air permeability of the matrix 2 is very high. Also, since dry adsorbent particles are attached to the matrix 2, the binder does not cover the surfaces of the adsorbent particles so widely, the deodorizing power is less reduced, and the adsorbent particles can be attached in a large amount per unit surface area.

For an optimum pleated shape, the pleating pitch may be appropriately designed for the matrix 2 taking in consideration the allowable thickness and pressure loss of an intended product of air filter. However, as the pleating pitch is smaller, the pleating factor is increased correspondingly and the deodorizing power of the filter is increased, but the pressure loss becomes greater. On the other hand, if the pleating pitch is too large, the pressure loss is larger and the deodorizing power is also decreased. Since the pleating pitch for a least pressure loss varies depending upon the crest height of the pleats, thickness of the matrix 2, number of pore per inch and size of the adsorbent particles attached to the matrix 2, the pleating pitch has to be designed for an intended product of air filter. The matrix 2 should be 1 to 10 mm thick, or more preferably 2 to 5 mm, and the cell number of pores per inch should be 6 to 80, or more preferably 9 to 50.

As having been described in the foregoing, the present invention provides an air filter showing highly improved effects of dust collection and deodorization even when air is driven at a high speed.

Figure 6:
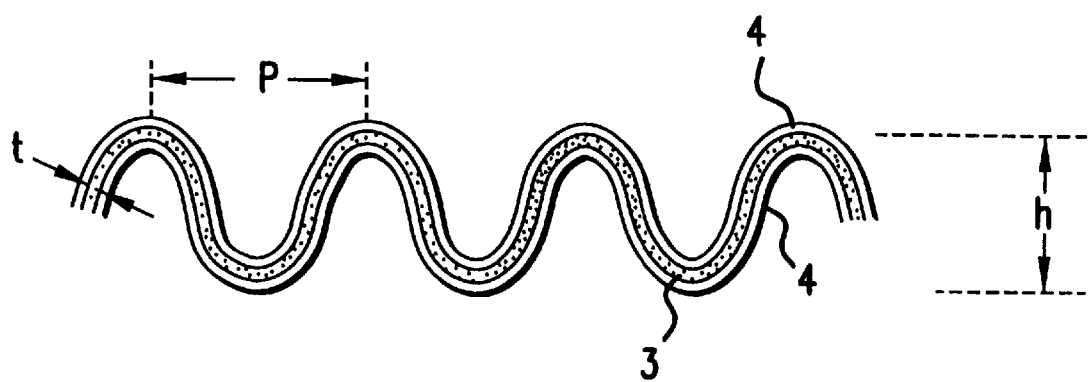
FIG. 6 is a side elevation of a third embodiment of air filter according to the present invention.

FIG. 6 shows the third preferred embodiment of the present invention. The air filter according to this embodiment uses a matrix 3 comprising three layers: a polyurethane foam layer having a three-dimensional network skeletal structure of small cells on one or both sides thereof, a non-solvent type binder layer applied to and into the porous skeletal structure surface of the polyurethane foam, and a layer of adsorbent particles applied to the binder layer, each of the particles being secured at one portion thereof to the binder layer while the remainder thereof is exposed. The matrix 3 has formed on the surface thereof a dust filter layer 4, and this assembly as a whole is pleated. The matrix 3 also serves as a deodorization filter.

The adsorbent particles in this embodiment are the same as in the second embodiment. The air permeability ($cm^3/cm^3/sec$) of the polyurethane foam for this matrix 3 having a thickness of 10 mm should be 150 or more, or more preferably 250 or more, as measured by the FRAGILE type testing apparatus as specified in the Standard JIS L 1004-1982 (Testing Method for Cotton Fabrics). The number of pores per inch of the matrix 3 should preferably be 6 to 80, or more preferably 9 to 50.

The dust filter layer 4 is formed on the surface of the matrix 3 such as the matrix examples 190 1 to 190 4 shown in Table 2. The polyurethane used as the base of the matrix 3, a nonwoven fabric, paper, or the like may suitably be used to make the dust filter 4. Namely, the dust filter layer 4 may be formed from any material which would be capable of dust collection.

To pleat a lamination of the matrix 3 dust filter layer 4, an accordion pleating machine was employed to form an air filter having a pleating crest height h of 20 mm and an pleating pitch p of 10 mm. The matrix 3 had a thickness t of 2.5 mm, and the dust filter layer 4 has a thickness of 1 mm. Thus, the lamination of this matrix 3 and layer 4 had a thickness of 4.5 mm.

The deodorization filter layer in this third embodiment used the above-mentioned matrix 3, and the dust filter layer 4 was made of a polyurethane foam having a three-dimensional network skeletal structure having 40 pores per inch and a thickness of 1 mm. The polyurethane foam was superposed on the matrix 3 to form a lamination of 4.5 mm in thickness. Thereafter, the accordion pleating machine was used to provide an air filter pleated to have a pleating factor of 4, a crest height h of 20 mm and an pleating pitch p of 10 mm. For this laminating, an acryl type emulsion binder (by Soken Chemical & Engineering Co., Ltd.) was coated to one side of the matrix 3 beforehand to a thickness of 40 g/m² to avoid degradation of the air permeability. After drying the binder thus applied, the above-mentioned polyurethane foam of 1 mm thickness was applied to both sides of the matrix 3 to form the dust filter layer 4. Otherwise, a hot-melt web, film or powder may be coated on the matrix 3, and then the dust filter layer 4 be welded, by heating, to the matrix 3 at the time of pleating the assembly of the matrix 3 and layer 4.

A fourth embodiment was made using a matrix 3 similar to that in the third embodiment. This matrix 3 was provided on one side thereof (upstream) with a dust filter layer made of a polypropylene nonwoven fabric (EB-04HZ5, mass of 20 g/m² by Mitsui Petrochemical) entangled in a core of a polypropylene resin net, and at the other side (downstream) with a dust filter similar to that in the third embodiment. This assembly was pleated as in the third embodiment.

For comparison with the third and fourth embodiments, a comparison example #5 was prepared using a paper-based matrix of 20 mm in thickness, 12.5 in pleating factor, 2.0 mm in crest height and 3.2 mm in pleating pitch, and on which a deodorant was applied in an amount of 115 g/m².

The results of performance comparison among the third and fourth embodiments and the comparison example #5 are as shown in Table 5.

TABLE 5

|  | Pressure loss (mmAq) | Deodorizing power (initial) | | Efficiency of dust collection (%) at linear velocity of 3 m/sec |
| --- | --- | --- | --- | --- |
|  |  | 80 ppm of n-butane | 3 ppm of acetaldehyde |  |
| Third embodiment | 8.0 | 87% | 80% | 36 |
| Fourth embodiment | 8.75 | 87% | 80% | 40 |
| Comparison example #4 | 10.0 | 17% | 11% | 21 |

As is apparent from Table 5, the third and fourth embodiments are capable of highly efficient and effective deodorization and dust collection as compared with the comparison example #5. The reason for this capability seems to exist in the good air permeability and high performance of deodorization of the matrix 3 made of a polyurethane foam having the three-dimensional network skeletal structure and serving as a deodorizing filter.

All the embodiments of the present invention having been described in the foregoing have a three-layer structure. However, they may be formed to have a two-layer structure in which the dust filter layer 4 is laminated only on one side of the matrix 3, or to have a multi-layer structure in which a polyurethane foam, nonwoven fabric or paper subjected to antibacterial treatment is laminated on one or both sides of the matrix 3. In addition, if the matrix 2 being a deodorization filter shown in FIG. 4 and the matrix 3 being also the deodorization filter shown in FIG. 6 are made using, as the base, a polyurethane foam having a three-dimensional network skeletal structure, the deodorization filter may be formed by simply dipping the polyurethane foam in a slurry, a mixture of a deodorant and binder, and drying it.

Since the optimum crest height and pleating pitch for pleating vary depending upon the thickness and number of pores per inch of the dust filter layer 4 and matrix 3, the mass per unit area for a nonwoven fabric or paper used as the matrix or upon the particle size of adsorbent particles attached to the matrix 3, they may be appropriately designed taking in consideration the thickness and allowable pressure loss of an intended product of air filter. The pleating temperature has to be properly selected for a selected pleating speed and type of the matrix 3. For the first and second embodiments, the pleating was done with both the upper and lower heaters set to a heating temperature of 175° C. and at a rate of 30 crests per min. For the third embodiment, the pleating was done with the lower heater coming in contact with the polypropylene nonwoven fabric layer regulated for a heating temperature of 60° C. while the lower heater coming in contact with the polyurethane foam regulating for a heating temperature of 175° C., and at a rate of 30 crests per min.

Pleating of the matrix 1 of FIG. 1, or the matrix 3 having formed thereon the dust filter layer 4 of FIG. 6, would not present a problem if made of materials such as paper or non-woven fabric. These conventional materials are relatively thin and strong, and generally not subject to excessive elongation, and are therefore easy to pleat, and an article so produced will retain such pleating. However, the matrix 1 or 3 in accordance with the various embodiments of the invention is made of polyurethane foam. In contrast to conventional materials like paper, etc., polyurethane foam is relatively thick, not as strong, and easily elongates, and is thus hard to pleat. Conventional methods heretofore did not adequately suggest a means by which polyurethane foam could be pleated. Therefore, to pleat the matrix 1 or 3 comprised of a polyurethane foam, it is necessary to heat, compress in a pleating direction, and cool the polyurethane material while maintaining compression of same. In furtherance of various contemplated production methods in accordance with embodiment of the invention, the heating is preferably effected at a temperature ranging from about 60 to about 200+ C. for a time period of about 0.5 to about 2 minutes. A preferably force of compression is in a range of about 10 to about 60 kg/m (over the pleat length). The cooling should preferably be done at a temperature of 20° C. or less for a time of about 3 minutes.

A fifth embodiment of the present invention will be described below with structural reference to FIG. 6. A matrix 3 was made using a polyether urethane form having a three-dimensional skeletal structure of 16 pores per inch and 2.5 mm in thickness, and it was applied, at a rate of 300 g/m², with activated coconut husk carbon particles each of 60 meshes in mean size. The matrix 3 was provided on either outer surface thereof with another dust filter layer 4 made of a polyether urethane foam having a three-dimensional skeletal structure of 40 pores per inch and 1 mm in thickness. Namely, a three-layer structure was prepared which would be subject to a pleating. An accordion pleating machine was used to pleat the preliminary air filter structure for a crest height h of 20 mm, pleating pitch p of 10 mm and a pleating factor of about 4. For this pleating, the structure was heated at 175° C. for 6 sec while being applied with a pressure of 25 kg/m (over the pleat length), and then cooled at a temperature of 20° C. or less for 180 sec.

Next, a sixth embodiment of the present invention will be described below, also with reference to FIG. 6. As in the fifth embodiment, the matrix 3 was provided on either outer surface thereof with an electrified non-woven fabric of polypropylene at a rate of 40 g/m² to have a similar three-layer structure. Also, an accordion pleating machine was employed to pleat it for a crest height h of 20 mm, pleating pitch p of 10 mm and pleating factor of about 4. For this pleating, the structure was heated at 70° C. for 150 sec while being applied with a pressure of 35 kg/m (over the pleat length), and then cooled at a temperature of 20° C. or less for 180 sec. The electrified polypropylene non-woven fabrics applied to both outer surfaces of the matrix 3 are dust filter layers 4.

To prevent both dust filter layers from being separated from the matrix 4 and adsorbent particles from coming off from the matrix 3, or to reinforce the pleats (for retention of the pleats), an adhesive layer may be provided between each of the dust filter layers 4 and the matrix 3. For the adhesive, a suitable one may be used but a one should preferably be selected from a polyamide, ethylene vinyl acetate copolymer (EVA), acrylic and urethane adhesives.

Also, a reinforcing material having a good air permeability may be provided as laminated between the matrix and each of the dust filter layers to enhance the rigidity of the pleats. As a reinforcing material for this purpose, a polypropylene net may be used.

It should be noted that the above-mentioned heating temperature and time, compressing force and time, and cooling temperature and time are necessary for pleating in the previously described first to fourth embodiments.

The existence of the dust filter layer 4 contributes to an addition of a secondary dust collection and a prevention of the adsorbent particles form coming off the matrix 3.

As having been described in the foregoing, the air filter according to the present invention is capable of a high performance of dust collection and deodorization because it assures a decreased pressure loss through the matrix itself, and the dust filter layer adds to an improved performance of dust collection and prevents the adsorbent particles from coming off the matrix.

What is claimed is:

1. A method for producing an air filter, comprising the steps of:
    providing a polyurethane foam sheet having a three-dimensional porous network skeletal structure of micro cells;
    heating said polyurethane foam sheet;
    compressing said polyurethane foam sheet to form a pleated structure;
    cooling said pleated structure while maintaining said step of compressing of said polyurethane foam sheet.

2. The method according to claim 1, wherein:
    said step of heating is effected at a temperature ranging from about 60 to about 200° C. and maintained for a time period of about 0.5 to about 2 minutes.

3. The method according to claim 1, wherein:
    step of compressing is effected with a force of compression in a range of about 10 to about 60 kg/m over a pleat length.

4. The method according to claim 1, wherein:
    said step of cooling is carried out at a temperature of 20° C. or less for a time of about 3 minutes.

5. The method according to claim 1, wherein at least portions of said step of heating and compressing are carried out simultaneously.

6. The method according to claim 1, wherein said step of heating is carried out prior to said step of compressing.

7. An air filter, comprising:
    a polyurethane foam sheet having a three-dimensional porous network skeletal structure of micro cells;
    a dust filter layer in laminated engagement with at least one side of said polyurethane foam sheet, said dust filter layer comprising a non-woven, porous material made of an electrified fabric of polypropylene; and
    a combination of said polyurethane foam sheet and said dust filter layer comprising a filter matrix, said filter matrix having a pleated configuration.

8. The air filter according to claim 7, further comprising an adhesive layer disposed between said dust filter layer and said matrix for at least partially achieving said laminated engagement.

9. The air filter according to claim 8, wherein said adhesive layer includes an adhesive selected from the group consisting of a polyamide, ethylene vinyl acetate copolymer, acrylic and urethane adhesives.

10. The air filter according to claim 7, further comprising a reinforcing material having air permeability disposed between said polyurethane foam sheet and said dust filter layer to enhance the rigidity of said pleated configuration.

11. The air filter according to claim 10, wherein said reinforcing material includes a polypropylene net.

12. The method according to claim 1, wherein said polyurethane foam sheet is made of a thermosetting resin.

13. The method according to claim 1, wherein said air filter is adapted for use in car air-conditioners.

14. The method according to claim 7, wherein said air filter is adapted for use in car air-conditioners.

* * * * *